United States Patent
Wang et al.

(10) Patent No.: US 10,442,883 B2
(45) Date of Patent: Oct. 15, 2019

(54) SOFT HETEROPHASIC RANDOM PROPYLENE COPOLYMER WITH IMPROVED CLARITY

(71) Applicant: Borealis AG, Vienna (AT)

(72) Inventors: Jingbo Wang, Engerwitzdorf (AT); Katja Klimke, Abu Dhabi (AE); Markus Gahleitner, Neuhofen/Krems (AT); Pauli Leskinen, Helsinki (FI); Johanna Lilja, Porvoo (FI)

(73) Assignee: Borealis AG, Vienna (AT)

( * ) Notice: Subject to any disclaimer, the term of this patent is extended or adjusted under 35 U.S.C. 154(b) by 110 days.

(21) Appl. No.: 15/741,662

(22) PCT Filed: Jul. 4, 2016

(86) PCT No.: PCT/EP2016/065637
§ 371 (c)(1),
(2) Date: Jan. 3, 2018

(87) PCT Pub. No.: WO2017/005667
PCT Pub. Date: Jan. 12, 2017

(65) Prior Publication Data
US 2018/0194887 A1    Jul. 12, 2018

(30) Foreign Application Priority Data
Jul. 8, 2015 (EP) .................................. 15175781

(51) Int. Cl.
*C08F 299/00*    (2006.01)
*B65D 1/02*    (2006.01)
*C08L 23/14*    (2006.01)

(52) U.S. Cl.
CPC .......... *C08F 299/00* (2013.01); *B65D 1/0207* (2013.01); *C08L 23/142* (2013.01); *C08L 2203/10* (2013.01); *C08L 2207/02* (2013.01); *C08L 2308/00* (2013.01); *C08L 2314/02* (2013.01)

(58) Field of Classification Search
CPC ....... C08F 299/00; B65D 1/207; C08L 23/142
See application file for complete search history.

(56) References Cited

U.S. PATENT DOCUMENTS

2016/0347944 A1* 12/2016 Wang .................. C08J 5/18

FOREIGN PATENT DOCUMENTS

| EP | 2610270 | 3/1988 |
|----|---------|--------|
| EP | 491566 | 12/1991 |
| EP | 591224 | 4/1994 |
| EP | 0887379 | 12/1998 |
| EP | 2733175 | 11/2012 |
| EP | 2610271 | 7/2013 |
| EP | 2610272 | 5/2017 |
| WO | 9212182 | 7/1992 |
| WO | 9219658 | 11/1992 |
| WO | 9924478 | 5/1999 |
| WO | 9924479 | 5/1999 |
| WO | 0068315 | 11/2000 |
| WO | 2004000899 | 12/2003 |
| WO | 2004111095 | 12/2004 |
| WO | 2010149549 | 12/2010 |
| WO | 2012007430 | 1/2012 |
| WO | 2014090818 | 6/2014 |

OTHER PUBLICATIONS

Zweifel, et al., "Crystallization and Nucleation of Semi-Crystaline Polymers" Plastics Additives Handbook, 5th Edition, 2001, pp. 956-965.
Nello Pasquini, "Blow Molding—Extrusion Blow Moldiing" Polypropylene Handbook, 2nd Edition, 2005, Hanser Publishers, p. 445.
Zweifel, et al., "Nucleating Agents For Semi-crystalline Polmers" Plastics Additives Handbook, 5th Edition, 2001, pp. 968-969.
Nello Pasquini, "Fabrication Processes" Polypropylene Handbook, 2nd Edition, 2005, Hanser Publishers, p. 422-443.
Brief English description of "IR-Spektroskopie für Anwender," Wiley-VCH, 1997.
Brief English description of "Validierung in der Analytik," Wiley-VCH, 1997.
Busico, et al., "Microstructure of polypropylene," Progress in Polymer Science, vol. 26, 2001, pp. 443-533, Elsevier.
Busico, et al., "Alk-1-ene Polymerization in the Presence of a Monocyclopentadienyl Zirconium (iv) Acetamidinate catalyst: Microstructural and Mechanistic Insights a," Macromolecular Rapid Commun., vol. 28, 2007, pp. 1128-1134, Wiley InterScience.
Busico, et al., "Full Assignment of the 13C NMR Spectra of Regioregular Polypropylenes: Methyl and Methylene Region," Macromolecules, vol. 30, 1997, pp. 6251-6263, American Chemical Society.
Kakugo, et al., "C NMR Determination of Monomer Sequence Distribution in Ethylene-Propylene Copolymers Prepared with s-TiCL13-AL (C2H5)2C1," Macromolecules, vol. 15, 1982, pp. 1150-1152, American Chemical Society.
Cheng, H.N., "C NMR Analysis of Ethylene-Propylene Rubbers," Macromolecules, vol. 17, 1984, pp. 1950-1955, American Chemical Society.
Extended European Search Report for 15175781.2 dated Jan. 20, 2016, 6 pgs.
International Search Report and Written Opinion for PCT/EP2016/065637 dated Aug. 16, 2016, 10 pages.
Resconi, et al., "Selectivity in Propene Polymerization with Metallocene Catalysts," Chem. Rev., vol. 100, 2000, pp. 1253-1345, American Chemical Society.
Wang, et al., "Structural Analysis of Ethylene/Propylene Copolymers Synthesized with a Constrained Geometry Catalyst," Macromolecules, vol. 33, 2000, pp. 1157-1162, American Chemical Society.

(Continued)

*Primary Examiner* — Catherine S Branch
(74) *Attorney, Agent, or Firm* — Lowenstein Sandler LLP

(57) ABSTRACT

The invention is related to a new soft heterophasic random propylene copolymer with improved optical properties, as well as the process by which the heterophasic random propylene copolymer is produced.

20 Claims, No Drawings

(56) References Cited

OTHER PUBLICATIONS

Zhou, et al., "A new decoupling method for accurate quantification of polyethylene copolymer composition and triad sequence distribution with 13C NMR," Journal of Magnetic Resonance, vol. 187, 2007, pp. 225-233, Elsevier.

Singh, et al., Triad Sequence Determination of Ethylene-Propylene Copolymers—Application of Quantitative 13C NMR, Polymer Testing, 29, 2009, pp. 475-479, Journal Homepage: www.elsevier.com/locate/polytest, Catalyst & Material Research Technology Center, Reliance Industries, Ltd.

* cited by examiner

SOFT HETEROPHASIC RANDOM PROPYLENE COPOLYMER WITH IMPROVED CLARITY

CROSS-REFERENCE TO RELATED APPLICATION(S)

This application is a national phase of International Application No. PCT/EP2016/065637, filed on Jul. 4, 2016, which claims the benefit of European Patent Application No. 15175781.2, filed on Jul. 8, 2015. The contents of these applications are hereby incorporated by reference in their entirety.

The present invention relates to a new soft heterophasic propylene copolymer with improved optical properties, as well as the process by which the heterophasic propylene copolymer is produced. Further the present invention is also directed to an article made of the inventive heterophasic propylene copolymer, particularly a blow moulded or injection moulded article.

Polymers, like polypropylene, are increasingly used in different demanding applications. At the same time there is a continuous search for tailored polymers which meet the requirements of these applications. For instance, heterophasic systems are known for their good impact behavior. Such heterophasic propylene copolymers comprise a matrix being either a propylene homopolymer or a random propylene copolymer in which an elastomeric copolymer is dispersed. Thus the polypropylene matrix contains (finely) dispersed inclusions being not part of the matrix and said inclusions contain the elastomeric copolymer. The term "inclusion" according indicates that the matrix and the inclusion form different phases within the heterophasic system, said inclusions are for instance visible by high resolution microscopy, like electron microscopy or atomic force microscopy, or can be identified by dynamic mechanical thermal analysis (DMTA). Specifically in DMTA the presence of a multiphase structure can be identified by the presence of at least two distinct glass transition temperatures.

Soft heterophasic propylene copolymers are quite suitable for the application in the field of extrusion blow molded (EBM) articles, such as bottles or hollow containers. For these articles good optical properties are required. It has become clear in the meantime that haze should not be the only value to be used for judging the quality of the optical properties of extrusion blow molded articles. In recent years, EBM bottles which have good clarity are highly welcome due to the fact that the customers need to see the products through the container. Therefore, clarity is an important parameter in such applications as it measures the light scattering <2.5°. For medical applications, the retention of the optical properties after sterilization is even more important. However, heterophasic systems which enable a skilled person to produce sterilisable extrusion blow moulded articles with high clarity are still a challenge.

A specific soft heterophasic propylene copolymer is described in WO 2008/141934 A1. This heterophasic propylene copolymer has a rather low melting temperature and low stiffness.

EP 2733175 A1 discloses a random propylene copolymer for extrusion blow molded articles, which combines the softness, low hexane content and good optical properties. However, the clarity of the material is still not satisfying.

Accordingly it is the object of the present invention to provide a propylene copolymer with high clarity, both before and after the sterilization, in the meanwhile maintain the low haze and low hexane content.

The present invention is based on the finding that the above mentioned objects can be achieved by a particular heterophasic propylene copolymer (RAHECO) having (a) a xylene cold soluble content (XCS) determined according ISO 16152 (25° C.) in the range of 25.0 to 35.0 wt.-%, and (b) a comonomer content in the range of more than 4.5 to 10.0 wt.-%, wherein further (c) the comonomer content of xylene cold soluble (XCS) fraction of the propylene copolymer is in the range of 12.0 to 22.0 wt.-%, (d) the intrinsic viscosity (IV) determined according to DIN ISO 1628/1 (in decalin at 135° C.) of the xylene cold soluble (XCS) fraction of the propylene copolymer is in the range of more than 1.5 to below 3.0 dl/g, and (e) the relative content of isolated to block ethylene sequences (I(E)) of the XCS fraction fulfilling the inequation (I)

$$I(E) < 78 - 1.97 \times C2 + 0.015 \times (C2)^2 \qquad (I)$$

wherein C2 is the comonomer content [wt %] of the XCS fraction and wherein the I(E) content is defined by equation (II)

$$I(E) = fPEP/((fEEE + fPEE + fPEP)) \times 100 \qquad (II)$$

wherein

I(E) is the relative content of isolated to block ethylene sequences [in %];

fPEP is the mol fraction of propylene/ethylene/propylene sequences (PEP) in the sample;

fPEE is the mol fraction of propylene/ethylene/ethylene sequences (PEE) and of ethylene/ethylene/propylene sequences (EEP) in the sample;

fEEE is the mol fraction of ethylene/ethylene/ethylene sequences (EEE) in the sample wherein all sequence concentrations are based on a statistical triad analysis of 13C-NMR data.

It is found that the rather high overall comonomer content of the heterophasic propylene copolymer (RAHECO) combined with a propylene rich xylene cold soluble (XCS) fraction gives rise to a material with surprisingly good balance of optical properties and softness as well as especially high clarity before and after sterilization. Furthermore, it is desired that the heterophasic propylene copolymer (RAHECO) is free of phthalic acid esters as well as their respective decomposition products, preferably the heterophasic propylene copolymer (RAHECO) is free of phthalic compounds as well as their respective decomposition products.

According to the present invention the term "phthalic compounds" refers to phthalic acid (CAS No. 88-99-3), its mono- and diesters with aliphatic, alicyclic and aromatic alcohols as well as phthalic anhydride.

In the following the present invention are defined in more detail.

The heterophasic propylene copolymer (RAHECO) in the present invention comprises apart from propylene also comonomers. Preferably the propylene copolymer comprises apart from propylene ethylene and/or C4 to C12 α-olefins. Accordingly the term "propylene copolymer" according to this invention is understood as a polypropylene comprising, preferably consisting of, units derivable from (a) propylene and
(b) ethylene and/or C4 to C12 α-olefins.

Thus the heterophasic propylene copolymer (RAHECO) according to this invention comprises monomers copolymerizable with propylene, for example comonomers such as ethylene and/or C4 to C12 α-olefins, in particular ethylene and/or C4 to C8 α-olefins, e.g. 1-butene and/or 1-hexene. Preferably the heterophasic propylene copolymer (RAHECO) according to this invention comprises, especially consists of, monomers copolymerizable with propylene from the group consisting of ethylene, 1-butene and 1-hexene. More specifically the propylene copolymer of this invention comprises—apart from propylene—units derivable from ethylene and/or 1-butene. In a preferred embodiment the propylene copolymer according to this invention comprises units derivable from ethylene and propylene only.

Additionally it is appreciated that the heterophasic propylene copolymer (RAHECO) preferably has a comonomer content in a very specific range which contributes to the softness and good optical properties. Thus it is required that the comonomer content of the propylene copolymer is in the range of 4.5 to 10.0 wt.-%, like in the range of 4.5 to below 10.0 wt.-%, more preferably in the range of 4.5 to 9.5 wt.-%, yet more preferably in the range of equal or more than 5.0 to 9.0 wt.-%, like in the range of equal or more than 6.0 to 9.0 wt.-%.

Another characteristic feature of the instant heterophasic propylene copolymer (RAHECO) is its rather moderate xylene cold soluble (XCS) fraction. Accordingly it is appreciated that the heterophasic propylene copolymer (RAHECO) has a xylene cold soluble fraction in the range of 25.0 to 35.0 wt.-%, like in the range of 25.0 to below 35.0 wt.-%, more preferably in the range of 27.0 to 34.0 wt.-%, yet more preferably in the range of equal or more than 28.0 to 33.5 wt-%.

The heterophasic propylene copolymer (RAHECO) of the instant invention can be further defined by the amount of comonomers within the xylene cold soluble (XCS) fraction. Accordingly it is preferred that the comonomer content in the xylene cold soluble fraction (XCS) of the heterophasic propylene copolymer (RAHECO) is rather low. Thus it is appreciated that the comonomer content of the xylene cold soluble fraction (XCS) of the heterophasic propylene copolymer (RAHECO) is in the range of 12.0 to 22.0 wt.-%, yet more preferably in the range of 14.0 to 20.0 wt.-%, still more preferably in the range of 15.0 to 19.0 wt.-%.

Concerning the comonomers present in the xylene cold soluble fraction (XCS) it is referred to the information provided for the heterophasic propylene copolymer (RAHECO). Accordingly in a specific embodiment the xylene cold soluble fraction (XCS) comprises, especially consists of, monomers copolymerizable with propylene from the group consisting of ethylene, 1-butene and 1-hexene. More specifically the xylene cold soluble fraction (XCS) comprises—apart from propylene—units derivable from ethylene and/or 1-butene. In a preferred embodiment the xylene cold soluble fraction (XCS) comprises units derivable from ethylene and propylene only.

Considering the information provided above, it is preferred that the propylene copolymer fulfills inequation (I), more preferably inequation (Ia), yet more preferably inequation (Ib), still more preferably inequation (Ic), $$\frac{Co(\text{total})}{Co(XCS)} \leq 0.55, \quad (I)$$

$$\frac{Co(\text{total})}{Co(XCS)} \leq 0.50, \quad (Ia)$$

$$0.20 \leq \frac{Co(\text{total})}{Co(XCS)} \leq 0.55, \quad (Ib)$$

$$0.30 \leq \frac{Co(\text{total})}{Co(XCS)} \leq 0.50, \quad (Ic)$$

wherein

Co (total) is the comonomer content [wt.-%] of the heterophasic propylene copolymer (RAHECO) in total;

Co (XCS) is the comonomer content [wt.-%] of the xylene cold soluble fraction (XCS) of the heterophasic propylene copolymer (RAHECO).

Further it is appreciated that the xylene cold soluble (XCS) fraction of the heterophasic propylene copolymer (RAHECO) in the present invention is specified by its intrinsic viscosity. A low intrinsic viscosity (IV) value reflects a low average molecular weight. For the present invention it is preferably required that the xylene cold soluble fraction (XCS) of the heterophasic propylene copolymer (RAHECO) has an intrinsic viscosity (IV) measured according to ISO 1628/1 (at 135° C. in decalin) in the range of 1.5 to 3.0 dl/g, preferably in the range of 1.7 to below 2.8 dl/g, more preferably in the range of 1.8 to 2.7 dl/g.

A further requirement for the xylene cold soluble (XCS) fraction of the heterophasic propylene copolymer (RAHECO) is a specific content of isolated to block ethylene sequences (I(E)).

The I(E) content is defined by equation (I)

$$I(E) = \frac{fPEP}{(fEEE + fPEE + fPEP)} \times 100 \quad (I)$$

wherein

I(E) is the relative content of isolated to block ethylene sequences [in %];

fPEP is the mol fraction of propylene/ethylene/propylene sequences (PEP) in the sample;

fPEE is the mol fraction of propylene/ethylene/ethylene sequences (PEE) and of ethylene/ethylene/propylene sequences (EEP) in the sample;

fEEE is the mol fraction of ethylene/ethylene/ethylene sequences (EEE) in the sample wherein all sequence concentrations being based on a statistical triad analysis of $^{13}$C-NMR data.

The I(E) content, which can also be called normalized PEP value (nPEP), has to fulfill the inequation (I):

$$I(E) < 78 - 1.97 \times C2 + 0.015 \times (C2)^2 \quad (I)$$

wherein C2 is the comonomer content, preferably the ethylene content, [wt %] of the XCS fraction.

The part of the heterophasic propylene copolymer (RAHECO) which is not soluble in cold xylene is the xylene cold insoluble (XCI) fraction. In a further preferred embodiment of the present invention also this fraction preferably exhibits some specific properties.

Accordingly it is preferred that the polydispersity (Mw/Mn) of the cold insoluble fraction (XCI) of the heterophasic propylene copolymer (RAHECO) is in the range of more than 4.9 to 10.0, more preferably in the range of 5.0 to 9.0, still more preferably in the range of 5.0 to 8.0.

In one preferred embodiment the comonomer content, preferably ethylene content, in the cold insoluble fraction (XCI) of the heterophasic propylene copolymer (RAHECO) is in the range of 3.0 to 7.0 wt.-%, yet more preferably in the range of 3.2 to 6.0 wt.-%.

Further it is preferred that the comonomer content, preferably ethylene content, in both fractions is in a specific ratio to each other. Accordingly it is preferred that the heterophasic propylene copolymer (RAHECO) fulfills inequation (II) more preferably inequation (IIa), yet more preferably inequation (IIb), $$2.8 \leq \frac{Co(XCS)}{Co(XCI)} \leq 5.5 \quad \text{(II)}$$

$$3.0 \leq \frac{Co(XCS)}{Co(XCI)} \leq 5.2 \quad \text{(IIa)}$$

$$3.2 \leq \frac{Co(XCS)}{Co(XCI)} \leq 5.0 \quad \text{(IIb)}$$

wherein

Co (XCS) is the comonomer content [wt.-%] of the xylene cold soluble (XCS) of the heterophasic propylene copolymer (RAHECO), Co (XCI) is the comonomer content [wt.-%] of the xylene cold insoluble (XCI) of the heterophasic propylene copolymer (RAHECO).

In a further preferred embodiment of the present invention, the heterophasic propylene copolymer (RAHECO) according to this invention is further featured by a rather low melt flow rate $MFR_2$ (230° C.). Accordingly the heterophasic propylene copolymer (RAHECO) preferably has a melt flow rate $MFR_2$ (230° C.) measured according to ISO 1133 in the range of more than 0.8 to 2.5 g/10 min, preferably in the range of more than 1.0 to 2.2 g/10 min, more preferably in the range of 1.2 to 2.0 g/10 min.

Preferably, the heterophasic propylene copolymer (RAHECO) in the present invention is α-nucleated, i.e. comprises an α-nucleating agent.

Further it is preferred that the propylene copolymer has an hexane soluble content of below 5.5 wt.-%, preferably in the range of 0.5 to below 5.5 wt.-%, more preferably in the range of 2.0 to 5.2 wt.-%, like in the range of 2.0 to 5.0 wt.-%.

Preferably it is desired that the heterophasic propylene copolymer (RAHECO) in the present invention is thermo-mechanically stable, so that for instance a thermal sterilization process can be accomplished. Accordingly it is preferred that the heterophasic propylene copolymer (RAHECO) has a melting temperature of at least 140° C., preferably in the range of 143 to 158° C., more preferably in the range of 144 to 156° C., like in the range of 145 to 154° C.

As indicated above, the instant heterophasic propylene copolymer (RAHECO) is featured by a considerable amount of a xylene cold soluble (XCS) fraction. On the other hand the heterophasic propylene copolymer (RAHECO) is also preferably featured by a rather high amount of a crystalline fraction melting at high temperature. Accordingly, a heterophasic propylene copolymer can be featured as that it comprises a polymer matrix, like a (semi)crystalline polypropylene, in which the amorphous material, like an elastomeric propylene copolymer, is dispersed. Thus in a preferred embodiment the instant heterophasic propylene copolymer (RAHECO) comprising a matrix (M) being a random propylene copolymer (R-PP) and dispersed therein an elastomeric propylene copolymer (E). Thus the matrix (M) contains (finely) dispersed inclusions being not part of the matrix (M) and said inclusions contain the elastomeric propylene copolymer (E). The term "inclusion" according to this invention shall preferably indicate that the matrix and the inclusion form different phases within the heterophasic propylene copolymer (RAHECO), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Preferably the heterophasic propylene copolymer (RAHECO) according to this invention comprises as polymer components only the random propylene copolymer (R-PP) and the elastomeric propylene copolymer (E). In other words the heterophasic propylene copolymer (RAHECO) may contain further additives, especially α-nucleating agents, but no other polymer in an amount exceeding 5 wt-%, more preferably exceeding 3 wt.-%, like exceeding 1 wt.-%, based on the total heterophasic propylene copolymer (RAHECO). One additional polymer which may be present in such low amounts is a polyethylene which is a by-reaction product obtained by the preparation of heterophasic propylene copolymer (RAHECO) (see in detail below). Accordingly it is in particular appreciated that the instant heterophasic propylene copolymer (RAHECO) contains only the random propylene copolymer (R-PP), the elastomeric propylene copolymer (E) and optionally polyethylene in amounts as mentioned in this paragraph.

Preferably the weight ratio between the matrix (M), i.e. the random propylene copolymer (R-PP), and the elastomeric propylene copolymer (E) is 60/40 to 95/5, more preferably 70/30 to 90/10, yet more preferably 75/25 to 88/12.

In the following the random propylene copolymer (R-PP) and the elastomeric propylene copolymer (E) are defined more precisely.

The random propylene copolymer (R-PP) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP) according to this invention comprises, especially consists of, monomers copolymerizable with propylene from the group consisting of ethylene, 1-butene and 1-hexene. More specifically the random propylene copolymer (R-PP) of this invention comprises—apart from propylene—units derivable from ethylene and/or 1-butene. In a preferred embodiment the random propylene copolymer (R-PP) comprises units derivable from ethylene and propylene only.

The comonomer content of the random propylene copolymer (R-PP) is not more than 7.0 wt.-%, more preferably not more than 6.0 wt.-%, still more preferably in the range of 1.5 to 7.0 wt.-%, yet more preferably in the range of 2.0 to 6.0 wt.-%.

Further it is appreciated that the propylene copolymer fulfills inequation (III), more preferably inequation (IIIa), yet more preferably inequation (IIIb), still more preferably inequation (IIIc), still yet more preferably inequation (IIId), $$\frac{Co(\text{total})}{Co(RPP)} \geq 1.3, \quad \text{(III)}$$

$$\frac{Co(\text{total})}{Co(RPP)} \geq 1.4, \quad \text{(IIIa)}$$

$$4.0 \geq \frac{Co(\text{total})}{Co(RPP)} \geq 1.3, \quad \text{(IIIb)}$$

$$3.5 \geq \frac{Co(\text{total})}{Co(RPP)} \geq 1.4, \quad \text{(IIIc)}$$

$$3.0 \geq \frac{Co(\text{total})}{Co(RPP)} \geq 1.4, \quad \text{(IIId)}$$

wherein

Co (total) is the comonomer content [wt.-%] of the propylene copolymer,

Co (RPP) is the comonomer content [wt.-%] of the random propylene copolymer (R-PP).

The term "random" indicates that the comonomers of the random propylene copolymer (R-PP), as well as of the first propylene copolymer fraction (R-PP1) and the second propylene copolymer fraction (R-PP2) are randomly distributed within the propylene copolymers. The term random is understood according to IUPAC (Glossary of basic terms in polymer science; IUPAC recommendations 1996).

The comonomer content of the matrix (M), i.e. of the random propylene copolymer (R-PP), has also impact on the amount of xylene cold solubles in the matrix (M). Thus it is preferred that the amount of the xylene cold soluble (XCS) fraction of the matrix (M), i.e. of the random propylene copolymer (R-PP), is equal or below 20.0 wt.-%, more preferably is in the range of 8.0 to equal or below 20.0 wt.-%, like in the range of 10.0 to 18.0 wt.-%.

The random propylene copolymer (R-PP) preferably has a melt flow rate $MFR_2$ (230° C.) in the range of more than 0.5 to equal or below 3.0 g/10 min, like in the range of more than 0.5 to below 3.0 g/10 min, more preferably in the range of more than 0.5 to 2.5 g/10 min, still more preferably in the range of 0.6 to 2.2 g/10 min, like in the range of 0.7 to below 2.0 g/10 min.

The random propylene copolymer (R-PP) preferably comprises at least two polymer fractions, like two or three polymer fraction, all of them are propylene copolymers. Preferably the random propylene copolymer (R-PP) comprises at least two different random propylene copolymer fractions, like two different random propylene copolymer fractions, wherein further the two random propylene copolymer fractions differ in the comonomer content and/or in the melt flow rate $MFR_2$ (230° C.), preferably differ in the comonomer content and in the melt flow rate $MFR_2$ (230° C.).

Preferably one fraction of the two random polymer copolymer fractions of the random propylene copolymer (R-PP) is the commoner lean fraction and the other fraction is the comonomer rich fraction, wherein further the lean fraction and the rich fraction fulfils inequation (IV), more preferably inequation (IVa), still more preferably inequation (IVb), $$\frac{Co(\text{lean})}{Co(\text{rich})} \leq 055, \quad \text{(IV)}$$

$$0.10 \leq \frac{Co(\text{lean})}{Co(\text{rich})} \leq 0.50, \quad \text{(IVa)}$$

$$0.15 \leq \frac{Co(\text{lean})}{Co(\text{rich})} \leq 0.45 \quad \text{(IVb)}$$

wherein

Co (lean) is the comonomer content [wt.-%] of the random propylene copolymer fraction with the lower comonomer content, Co (rich) is the comonomer content [wt.-%] of the random propylene copolymer fraction with the higher comonomer content.

In addition or alternatively to inequation (IV) one fraction of the two random polymer copolymer fractions of the random propylene copolymer (R-PP is the low melt flow rate $MFR_2$ (230° C.) fraction and the other fraction is the high melt flow rate $MFR_2$ (230° C.) fraction, wherein further the low flow fraction and the high flow fraction fulfils inequation (V), more preferably inequation (Va), still more preferably inequation (Vb), $$\frac{MFR(\text{high})}{MFR(\text{low})} \geq 1.80 \quad \text{(V)}$$

$$15.0 \geq \frac{MFR(\text{high})}{MFR(\text{low})} \geq 2.50 \quad \text{(Va)}$$

$$12.0 \geq \frac{MFR(\text{high})}{MFR(\text{low})} \geq 4.50 \quad \text{(Vb)}$$

wherein

MFR (high) is the melt flow rate $MFR_2$ (230° C.) [g/10 min] of the random propylene copolymer fraction with the higher melt flow rate $MFR_2$ (230° C.), MFR (low) is the melt flow rate $MFR_2$ (230° C.) [g/10 min] of the random propylene copolymer fraction with the lower melt flow rate $MFR_2$ (230° C.).

Even more preferred the random propylene copolymer (R-PP) comprises, preferably consists of, a first propylene copolymer fraction (R-PP1) and a second propylene copolymer fraction (R-PP2), wherein further the first propylene copolymer fraction (R-PP1) and the second propylene copolymer fraction (R-PP2) differ in the comonomer content and/or in the melt flow rate $MFR_2$ (230° C.), preferably differ in the comonomer content and in the melt flow rate $MFR_2$ (230° C.).

Thus in one embodiment the first random propylene copolymer fraction (R-PP1) has a higher comonomer content and melt flow rate $MFR_2$ (230° C.) than the second random propylene copolymer fraction (R-PP2).

In another embodiment the second random propylene copolymer fraction (R-PP2) has a higher comonomer content and melt flow rate $MFR_2$ (230° C.) than the first random propylene copolymer fraction (R-PP1).

In still another embodiment the first random propylene copolymer fraction (R-PP1) has a higher comonomer content but a lower melt flow rate $MFR_2$ (230° C.) than the second random propylene copolymer fraction (R-PP2);

In further embodiment the second random propylene copolymer fraction (R-PP2) has a higher comonomer content but a lower melt flow rate $MFR_2$ (230° C.) than the first random propylene copolymer fraction (R-PP1).

Thus it is especially preferred that the first random propylene copolymer fraction (R-PP1) and the second random propylene copolymer fraction (R-PP2) fulfill together the inequation (VI), more preferably inequation (VIa), still more preferably inequation (VIb), $$\frac{Co(R\text{-}PP1)}{Co(R\text{-}PP2)} \leq 0.55, \quad \text{(VI)}$$

-continued $$0.10 \leq \frac{Co(R\text{-}PP1)}{Co(R\text{-}PP2)} \leq 0.50, \quad \text{(VIa)}$$

$$0.15 \leq \frac{Co(R\text{-}PP1)}{Co(R\text{-}PP2)} \leq 0.45 \quad \text{(VIb)}$$

wherein

Co (R-PP1) is the comonomer content [wt.-%] of the first random propylene copolymer fraction (R-PP1), Co (R-PP2) is the comonomer content [wt.-%] of the second random propylene copolymer fraction (R-PP2).

In addition or alternatively to inequation (VI) the first random propylene copolymer fraction (R-PP1) and the second random propylene copolymer fraction (R-PP2) fulfill together the inequation (VII), more preferably inequation (VIIa), still more preferably inequation (VIIb), $$\frac{MFR(R\text{-}PP1)}{MFR(R\text{-}PP2)} \geq 1.80 \quad \text{(VII)}$$

$$15.0 \geq \frac{MFR(R\text{-}PP1)}{MFR(R\text{-}PP2)} \geq 2.50 \quad \text{(VIIa)}$$

$$12.0 \geq \frac{MFR(R\text{-}PP1)}{MFR(R\text{-}PP2)} \geq 4.50 \quad \text{(VIIb)}$$

wherein

MFR (R-PP1) is the melt flow rate $MFR_2$ (230° C.) [g/10 min] of of the first random propylene copolymer fraction (R-PP1), MFR (R-PP2) is the melt flow rate $MFR_2$ (230° C.) [g/10 min] of the second random propylene copolymer fraction (R-PP2).

In one specific embodiment the random propylene copolymer (R-PP) comprises, preferably consists of, the first random propylene copolymer fraction (R-PP1) and the second random propylene copolymer fraction (R-PP2), wherein further the random propylene copolymer (R-PP) fulfills (a) the inequation (VIII), more preferably inequation (VIIIa), still more preferably inequation (VIIIb), $$\frac{Co(R\text{-}PP1)}{Co(R\text{-}PP)} \leq 0.65, \quad \text{(VIII)}$$

$$0.15 \leq \frac{Co(R\text{-}PP1)}{Co(R\text{-}PP)} \leq 0.60, \quad \text{(VIIIa)}$$

$$0.20 \leq \frac{Co(R\text{-}PP1)}{Co(R\text{-}PP)} \leq 0.55 \quad \text{(VIIIb)}$$

wherein

Co (R-PP1) is the comonomer content [wt.-%] of the first random propylene copolymer fraction (R-PP1), Co (R-PP) is the comonomer content [wt.-%] of the random propylene copolymer fraction (R-PP).

and/or (b) the inequation (IX), more preferably inequation (IXa), still more preferably inequation (IXb), $$\frac{MFR(R\text{-}PP1)}{MFR(R\text{-}PP)} \geq 0.50 \quad \text{(VII)}$$

$$10.0 \geq \frac{MFR(R\text{-}PP1)}{MFR(R\text{-}PP)} \geq 1.00 \quad \text{(VIIa)}$$

$$8.0 \geq \frac{MFR(R\text{-}PP1)}{MFR(R\text{-}PP)} \geq 1.50 \quad \text{(VIIb)}$$

wherein

MFR (R-PP1) is the melt flow rate $MFR_2$ (230° C.) [g/10 min] of the first random propylene copolymer fraction (R-PP1), MFR (R-PP) is the melt flow rate $MFR_2$ (230° C.) [g/10 min] of the random propylene copolymer fraction (R-PP).

Thus it is preferred that the first random propylene copolymer fraction (R-PP1) has a comonomer content of equal or below 4.0 wt.-%, more preferably of equal or below 3.5 wt.-%, yet more preferably in the range 0.2 to 4.0 wt.-%, still more preferably in the range 0.5 to 3.5 wt.-%, like in the range of 1.0 to 3.0 wt.-%.

As the comonomer of the first random propylene copolymer fraction (R-PP1) preferably is rather low, also its xylene cold soluble (XCS) is comparably low. Thus it is preferred that the amount of the xylene cold soluble (XCS) fraction of the first random propylene copolymer fraction (R-PP1) is equal or below than 10.0 wt.-%, more preferably is in the range of 1.0 to 10.0 wt.-%, still more preferably is in the range of 2.0 to 9.0 wt.-%, yet more preferably is in the range of 2.5 to 8.0 wt.-%.

Preferably the first random propylene copolymer fraction (R-PP1) preferably has a melt flow rate $MFR_2$ (230° C.) in the range of in the range of 0.3 to 5.5 g/10 min, more preferably in the range 1.0 to 4.5 g/10 min.

On the other hand the second random propylene copolymer fraction (R-PP2) preferably has a comonomer content in the range of 1.0 to 12.0 wt.-%, still more preferably in the range 1.5 to 10.0 wt.-%, yet more preferably in the range 2.5 to 9.0 wt.-%.

The comonomers of the first random propylene copolymer fraction (R-PP1) and second random propylene copolymer fraction (R-PP2), respectively, copolymerizable with propylene are ethylene and/or $C_4$ to $C_{12}$ α-olefins, in particular ethylene and/or $C_4$ to $C_8$ α-olefins, e.g. 1-butene and/or 1-hexene. Preferably the first random propylene copolymer fraction (R-PP1) and second random propylene copolymer fraction (R-PP2), respectively, comprise, especially consist of, monomers copolymerizable with propylene from the group consisting of ethylene, 1-butene and 1-hexene. More specifically the first random propylene copolymer fraction (R-PP1) and second random propylene copolymer fraction (R-PP2), respectively, comprise—apart from propylene—units derivable from ethylene and/or 1-butene. In a preferred embodiment the first random propylene copolymer fraction (R-PP1) and the second random propylene copolymer fraction (R-PP2) comprise the same comonomers, i.e. ethylene only.

Preferably the second random propylene copolymer fraction (R-PP2) preferably has a melt flow rate $MFR_2$ (230° C.) in the range of in the range of 0.1 to 5.5 g/10 min, more preferably in the range 0.3 to 4.5 g/10 min.

Preferably the weight ratio between the first random propylene copolymer fraction (R-PP1) and the second random propylene copolymer fraction (R-PP2) is 20/80 to 80/20, more preferably 30/70 to 70/30, like 40/60 to 60/40.

As mentioned above a further component of the heterophasic propylene copolymer (RAHECO) is the elastomeric propylene copolymer (E) dispersed in the matrix (M), i.e. in the random propylene copolymer (R-PP). Concerning the comonomers used in the elastomeric propylene copolymer (E) it is referred to the information provided for the heterophasic propylene copolymer (RAHECO) and the random propylene copolymer (R-PP), respectively. Accordingly the elastomeric propylene copolymer (E) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the elastomeric propylene copolymer (E) comprises, especially consists of, monomers copolymerizable with propylene from the group consisting of ethylene, 1-butene and 1-hexene. More specifically the elastomeric propylene copolymer (E) comprises—apart from propylene—units derivable from ethylene and/or 1-butene. Thus in an especially preferred embodiment the elastomeric propylene copolymer (E) comprises units derivable from ethylene and propylene only. It is especially preferred that the random propylene copolymer (R-PP) and the elastomeric propylene copolymer (E) comprises the same comonomers. Accordingly in one specific embodiment the random propylene copolymer (R-PP) and the elastomeric propylene copolymer (E) comprise propylene and ethylene only.

The comonomer content of the elastomeric propylene copolymer (E) preferably is not more than 30.0.0 wt.-%, still more preferably in the range of 12.0 to 30.0 wt.-%, yet more preferably in the range of more than 14.0 to 28.0 wt.-%, even more preferably in the range of more than 15.0 to 26.0 wt.-%.

The heterophasic propylene copolymer (RAHECO), as defined in the instant invention may contain up to 5.0 wt.-% additives, like α-nucleating agents and antioxidants, as well as slip agents and antiblocking agents. Preferably the additive content is below 3.0 wt.-%, like below 1.0 wt.-%

Preferably the heterophasic propylene copolymer (RAHECO), comprises an α-nucleating agent. Even more preferred the present invention is free of β-nucleating agents. Accordingly, the α-nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyl-dibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate], and (iv) vinylcycloalkane polymer and vinylalkane polymer (as discussed in more detail below), and (v) mixtures thereof.

Such additives are generally commercially available and are described, for example, in "Plastic Additives Handbook", 5th edition, 2001 of Hans Zweifel.

Preferably the heterophasic propylene copolymer (RAHECO), contains up to 5 wt.-% of the α-nucleating agent. In a preferred embodiment, the propylene copolymer, i.e. the heterophasic propylene copolymer (RAHECO), contains not more than 200 ppm, more preferably of 1 to 200 ppm, more preferably of 5 to 100 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof.

It is especially preferred that the heterophasic propylene copolymer (RAHECO), contains a vinylcycloalkane polymer, like vinylcyclohexane (VCH) polymer and/or vinylalkane polymer. In one specific embodiment the propylene copolymer, i.e. the heterophasic propylene copolymer (RAHECO), contains a vinylcycloalkane polymer, like vinylcyclohexane (VCH) polymer and/or vinylalkane polymer. Preferably the vinylcycloalkane polymer is vinylcyclohexane (VCH) polymer introduced into the heterophasic propylene copolymer (RAHECO).

The present invention is not only directed to the instant propylene copolymer, i.e. the heterophasic propylene copolymer (RAHECO), but also to molded articles, preferably blow molded article (extrusion blow molded, injection blow molded or injection stretch blow molded), like extrusion blow molded article, e.g. bottles, like extrusion blow molded bottles, made therefrom. Accordingly in a further embodiment the present invention is directed to a molded article, like a molded bottle, preferably to a blow molded article, more preferably to extrusion blow molded article, like extrusion blow molded bottle, comprising at least 70 wt.-%, preferably comprising at least 80 wt.-%, more preferably comprising at least 90 wt.-%, still more preferably comprising at least 95 wt.-%, yet more preferably comprising at least 99 wt.-%, of the instant propylene copolymer, i.e. the heterophasic propylene copolymer (RAHECO). In one preferred embodiment the molded articles, like a molded bottle, preferably the blow molded article, more preferably the extrusion blow molded article, like extrusion blow molded bottle, consists of the propylene copolymer, i.e. consists of the heterophasic propylene copolymer (RAHECO). In one specific embodiment the blow molded article is a blow molded bottle, like an extrusion blow molded bottle.

The applied processes for the manufacture of moulded articles are within the knowledge of the skilled person. Reference is made to Polypropylene Handbook, Nello Pasquini, $2^{nd}$ edition, Hanser. For instance, in the extrusion blow molding (EBM) process a polymer melt is first extruded through a tubular die into air forming a polymer tube, subsequently blowing up said polymer tube (typically called "parison" in this technical field) until the outside of the tube reaches the boundaries of the mold. To cover the wall of the mold fully with the blown up polymer tube is rather difficult compared to injection molding because the air between polymer tube and mold has to be removed totally which is a demanding process step. Further the inside of the polymer tube is not in contact with the mold and therefore there is only little possibility to influence the inner surface structure of the tube. As a consequence thereof extrusion blow molded articles, like bottles, normally show inferior optical properties compared to any injection molded articles. For instance, the surface property inside and/or outside of extrusion blown bottles is typically non-uniform (flow lines, melt fracture) leading to lower overall gloss and transparency compared to injection molded bottles or injection stretched blown molded articles (ISBM).

Typically the molded articles (bottles), preferably the blow molded articles (bottles), more preferably the extrusion blow molded articles (bottles), have a wall thickness in the range of 0.1 to 1.0 mm.

In a preferred embodiment of the present invention, an extrusion blow molded bottle with wall thickness of 0.3_mm comprising the said heterophasic propylene copolymer (RAHECO) has a clarity determined according to ASTM D1003 of higher than 70.0%, preferably higher than 72.0%.

The heterophasic propylene copolymer (RAHECO) in the present invention is preferably obtained by a specific process.

Accordingly the present invention is also related to a sequential polymerization process for producing the heterophasic propylene copolymer (RAHECO) comprising the steps of
(a) polymerizing in a first reactor (R1)
propylene and
ethylene and/or a C4 to C12 α-olefin, preferably ethylene,
obtaining a first polymer fraction, i.e. a first random propylene copolymer fraction (R-PP1),
(b) transferring the first polymer fraction, i.e. the first random propylene copolymer fraction (R-PP1), into a second reactor (R2),
(c) polymerizing in said second reactor (R2) in the presence of the first polymer fraction, i.e. of the first random propylene copolymer fraction (R-PP1),
propylene and
ethylene and/or a C4 to C12 α-olefin, preferably ethylene,
obtaining a second polymer fraction, i.e. a second random propylene copolymer fraction (R-PP2), the first and second polymer fraction form the random propylene copolymer (R-PP),
(d) transferring said random propylene copolymer (R-PP), into a third reactor (R3),
(e) polymerizing in said third reactor (R3) in the presence of the random propylene copolymer (R-PP),
propylene and
ethylene and/or a C4 to C12 α-olefin, preferably ethylene,
obtaining a third polymer fraction, said third polymer fraction is the elastomeric propylene copolymer (E); the third polymer fraction and the random propylene copolymer (R-PP), form the heterophasic propylene copolymer (RAHECO), and
(f) removing the propylene copolymer from the third reactor (R3).

Preferably between the second reactor (R2), and the third reactor (R3) the monomers are flashed out.

The term "sequential polymerization process" indicates that the heterophasic propylene copolymer (RAHECO) is produced in at least four reactors, preferably in four reactors, connected in series. Accordingly the present process comprises at least a first reactor (R1), a second reactor (R2), and a third reactor (R3). The term "polymerization reactor" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization reactors.

As stated above in the first two reactors the matrix (M), i.e. the random propylene copolymer (R-PP) is produced. More precisely, in the first reactor (R1) the first random propylene copolymer fraction (R-PP1) is produced whereas in the second reactor (R2) the second random propylene copolymer fraction (R-PP2).

The preferred comonomers used in the first reactor (R1) are the same as indicated above, for the first random propylene copolymer fraction (R-PP1). Accordingly especially preferred comonomers are ethylene, 1-butene and 1-hexene. In one specific embodiment the comonomer is ethylene.

Preferably the weight ratio between the first random propylene copolymer fraction (R-PP1) and the second random propylene copolymer fraction (R-PP2) is 20/80 to 80/20, more preferably 30/70 to 70/30, yet more preferably 40/60 to 60/40.

Accordingly in the first reactor (R1) a first random propylene copolymer fraction (R-PP1) is produced whereas in the second rector (R2) the second random propylene copolymer fraction (R-PP2) is produced obtaining thereby the random propylene copolymer (R-PP). Concerning the individual properties reference is made to the information provided above.

The comonomers of the random propylene copolymer (R-PP), of the first random propylene copolymer fraction (R-PP1), and of the second random propylene copolymer fraction (R-PP2) copolymerizable with propylene are ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP), the first random propylene copolymer fraction (R-PP1), and the second random propylene copolymer fraction (R-PP2) comprise, especially consist of, monomers copolymerizable with propylene from the group consisting of ethylene, 1-butene and 1-hexene. More specifically the random propylene copolymer (R-PP), the first random propylene copolymer fraction (R-PP1) and the second random propylene copolymer fraction (R-PP2) comprise—apart from propylene—units derivable from ethylene and/or 1-butene. In a preferred embodiment the random propylene copolymer (R-PP), the first random propylene copolymer fraction (R-PP1) and the second random propylene copolymer fraction (R-PP2) comprise the same comonomers, i.e. ethylene only.

Further the first random propylene copolymer fraction (R-PP1), i.e. the polymer of the first reactor (R1), has preferably a xylene cold soluble (XCS) fraction of equal or below than 10.0 wt.-%, more preferably in the range of 1.0 to 10.0 wt.-%, still more preferably in the range of 2.0 to 9.0 wt.-%, yet more preferably in the range of 2.5 to 8.0 wt.-%.

On the other hand the second random propylene copolymer fraction (R-PP2), i.e. the polymer produced in the second reactor (R2), preferably has a xylene cold soluble (XCS) fraction of equal or less than 40 wt.-%, more preferably in the range of 2 to 35 wt.-%, still more preferably in the range of 3 to 30 wt.-%.

Accordingly the overall xylene cold soluble (XCS) content in the second reactor, i.e. the xylene cold soluble (XCS) fraction of the random propylene copolymer (R-PP), preferably equal or below than 20.0 wt.-%, more preferably is in the range of 8.0 to equal or below 20.0 wt.-%, still more preferably is in the range of 10.0 to 18.0 wt.-%.

After the second reactor (R2) the matrix (M), i.e. the random propylene copolymer (R-PP), of the heterophasic propylene copolymer (RAHECO) is obtained. This matrix (M) is subsequently transferred into the third reactor (R3) in which the elastomeric propylene copolymer (E) is produced (step (e)) and thus the heterophasic propylene copolymer (RAHECO) of the instant invention is obtained.

Concerning the individual properties of the elastomeric propylene copolymer (E) and the heterophasic propylene copolymer (RAHECO), reference is made to the information provided above.

Preferably the weight ratio between the matrix (M), i.e. the random propylene copolymer (R-PP), after step (c) and the elastomeric propylene copolymer (E) produced in the step (e) is 60/40 to 90/10, more preferably 70/30 to 85/15.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2), and the third reactor (R3) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like loop reactor (LR), whereas the second reactor (R2), and third reactor (R3) are gas phase reactors (GPR). Accordingly for the instant process at least three, preferably three polymerization reactors, namely a slurry reactor (SR), like loop reactor (LR), a first gas phase reactor (GPR-1), and a second gas phase reactor (GPR-2) connected in series are used. If needed prior to the slurry reactor (SR) a pre-polymerization reactor is placed.

A preferred multistage process is a "loop-gas phase"-process, such as developed by Borealis N/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (RAHECO), as defined above the conditions for the first reactor (R1), i.e. the slurry reactor (SR), like a loop reactor (LR), of step (a) may be as follows:
- the temperature is within the range of 40° C. to 110° C., preferably between 60° C. and 100° C., like 68 to 95° C.,
- the pressure is within the range of 20 bar to 80 bar, preferably between 40 bar to 70 bar,
- hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:
- the temperature is within the range of 50° C. to 130° C., preferably between 60° C. and 100° C.,
- the pressure is within the range of 5 bar to 50 bar, preferably between 15 bar to 35 bar,
- hydrogen can be added for controlling the molar mass in a manner known per se.

The condition in the third reactor (R3), preferably in the second gas phase reactor (GPR-2), is similar to the second reactor (R2).

The residence time can vary in the three reactor zones.

In one embodiment of the process for producing the heterophasic propylene copolymer (RAHECO), the residence time the first reactor (R1), i.e. the slurry reactor (SR), like a loop reactor (LR), is in the range 0.2 to 4 hours, e.g. 0.3 to 1.5 hours and the residence time in the gas phase reactors will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 0 to 50° C., preferably from 10 to 45° C., and more preferably from 15 to 40° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages.

Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (RAHECO) is obtained by a sequential polymerization process, as described above, in the presence of a catalyst system.

As pointed out above in the specific process for the preparation of the heterophasic polypropylene composition as defined above, a specific Ziegler-Natta catalyst is preferably used.

Accordingly, the Ziegler-Natta catalyst will be now described in more detail.

The catalyst used in the present invention is a solid Ziegler-Natta catalyst, which comprises compounds of a transition metal of Group 4 to 6 of IUPAC, like titanium, a Group 2 metal compound, like a magnesium, and an internal donor being preferably a non-phthalic compound, more preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or MgCl2, but the catalyst is self-supported.

The Ziegler-Natta catalyst (ZN-C) can be further defined by the way as obtained.

Accordingly, the Ziegler-Natta catalyst (ZN-C) is preferably obtained by a process comprising the steps of
a)
$a_1$) providing a solution of at least a Group 2 metal alkoxy compound (Ax) being the reaction product of a Group 2 metal compound and a monohydric alcohol (A) comprising in addition to the hydroxyl moiety at least one ether moiety optionally in an organic liquid reaction medium; or a$_2$) a solution of at least a Group 2 metal alkoxy compound (Ax') being the reaction product of a Group 2 metal compound and an alcohol mixture of the monohydric alcohol (A) and a monohydric alcohol (B) of formula ROH, optionally in an organic liquid reaction medium; or a$_3$) providing a solution of a mixture of the Group 2 alkoxy compound (Ax) and a Group 2 metal alkoxy compound (Bx) being the reaction product of a Group 2 metal compound and the monohydric alcohol (B), optionally in an organic liquid reaction medium; or a$_4$) providing a solution of Group 2 alkoxide of formula M(OR$_1$)$_n$(OR$_2$)$_m$X$_{2-n-m}$ or mixture of Group 2 alkoxides M(OR$_1$)$_n$X$_{2-n'}$ and M(OR$_2$)$_m$X$_{2-m'}$, where M is Group 2 metal, X is halogen, R$_1$ and R$_2$ are different alkyl groups of C$_2$ to C$_{16}$ carbon atoms, and 0≤n<2, 0≤m<2 and n+m+(2−n−m)=2, provided that both n and m≠0, 0<n'≤2 and 0<m'≤2; and b) adding said solution from step a) to at least one compound of a transition metal of Group 4 to 6 and c) obtaining the solid catalyst component particles, and adding an internal electron donor, preferably a non-phthalic internal donor, at any step prior to step c).

The internal donor or precursor thereof is added preferably to the solution of step a).

According to the procedure above the Ziegler-Natta catalyst can be obtained via precipitation method or via emulsion (liquid/liquid two-phase system)—solidification method depending on the physical conditions, especially temperature used in steps b) and c).

In both methods (precipitation or emulsion-solidification) the catalyst chemistry is the same.

In precipitation method combination of the solution of step a) with at least one transition metal compound in step b) is carried out and the whole reaction mixture is kept at least at 50° C., more preferably in the temperature range of 55° C. to 110° C., more preferably in the range of 70° C. to 100° C., to secure full precipitation of the catalyst component in form of a solid particles (step c).

In emulsion-solidification method in step b) the solution of step a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion-solidification method is preferably used in the present invention.

In a preferred embodiment in step a) the solution of a$_2$) or a$_3$) are used, i.e. a solution of (Ax') or a solution of a mixture of (Ax) and (Bx).

Preferably the Group 2 metal is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are C$_2$ to C$_4$ glycol monoethers, wherein the ether moieties comprise from 2 to 18 carbon atoms, preferably from 4 to 12 carbon atoms.

Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched C$_6$-C$_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different C$_1$-C$_{20}$ alkyl, preferably C$_2$-C$_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R"(OH)$_m$ to obtain said magnesium alkoxide compounds. Preferred polyhydric alcohols, if used, are alcohols, wherein R" is a straight-chain, cyclic or branched C$_2$ to C$_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

Mg compound is typically provided as a 10 to 50 wt % solution in a solvent as indicated above. Typical commercially available Mg compound, especially dialkyl magnesium solutions are 20-40 wt % solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like TiCl$_4$.

The non-phthalic internal donor used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with an aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 g/m², more preferably below 10 g/m². Typically the amount of Ti is 1 to 6 wt %, Mg 10 to 20 wt % and donor 10 to 40 wt % of the catalyst composition.

Detailed description of preparation of catalysts is disclosed in WO 2012/007430, EP 2610271, EP 261027 and EP 2610272 which are incorporated here by reference.

The Ziegler-Natta catalyst is preferably used in association with an alkyl aluminum cocatalyst and optionally external donors.

As further component in the instant polymerization process an external donor is preferably present. Suitable external donors include certain silanes, ethers, esters, amines, ketones, heterocyclic compounds and blends of these. It is especially preferred to use a silane. It is most preferred to use silanes of the general formula $R^a_p R^b_q Si(OR^c)_{(4-p-q)}$ wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or of general formula $Si(OCH_2CH_3)_3(NR^3R^4)$ wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors are the dicyclopentyl dimethoxy silane donor (D-donor) or the cyclohexylmethyl dimethoxy silane donor (C-Donor).

In addition to the Ziegler-Natta catalyst and the optional external donor a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst is a trialkylaluminium, like triethylaluminium (TEAL), dialkyl aluminium chloride or alkyl aluminium dichloride or mixtures thereof. In one specific embodiment the co-catalyst is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly,
(a) the mol-ratio of co-catalyst (Co) to external donor (ED) [Co/ED] must be in the range of 5 to 45, preferably is in the range of 5 to 35, more preferably is in the range of 5 to 25; and optionally
(b) the mol-ratio of co-catalyst (Co) to titanium compound (TC) [Co/TC] must be in the range of above 80 to 500, preferably is in the range of 100 to 350, still more preferably is in the range of 120 to 300.

According to a further preferred embodiment, the heterophasic propylene copolymer (RAHECO) according to this invention is produced in the sequential polymeriszation process as defined above, preferably in the presence of
(a) a Ziegler-Natta catalyst comprising compounds (TC) of a transition metal of Group 4 to 6 of IUPAC, a Group 2 metal compound (MC) and an internal donor (ID), wherein said internal donor (ID) is a non-phthalic compound, preferably is a non-phthalic acid ester and still more preferably is a diester of non-phthalic dicarboxylic acids;
(b) optionally a co-catalyst (Co), and
(c) optionally an external donor (ED).

It is preferred that the internal donor (ID) is selected from malonates, maleates, succinates, glutarates, cyclohexene-1,2-dicarboxylates, benzoates, and derivatives and/or mixtures thereof, preferably the internal donor (ID) is a citraconate. Additionally or alternatively, the molar-ratio of co-catalyst (Co) to external donor (ED) [Co/ED] is 5 to 45.

The additives as stated above are added to the heterophasic propylene copolymer (RAHECO) preferably by extruding. For mixing/extruding, a conventional compounding or blending apparatus, e.g. a Banbury mixer, a 2-roll rubber mill, Buss-co-kneader or a twin screw extruder may be used. The polymer materials recovered from the extruder are usually in the form of pellets. These pellets are then further processed, e.g. by a (blow) mold forming process as described above.

In the following the present invention is further illustrated by means of examples.

EXAMPLES

1. Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the isotacticity and regio-regularity of the propylene homopolymers.

Quantitative $^{13}C\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics.

For propylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra.

Quantitative $^{13}C\{^{1}H\}$ NMR spectra were processed, integrated and relevant quantitative properties determined from the integrals using proprietary computer programs.

For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio-defects:

$P_{total}=P_{12}+P_{21e}$

The mole percent of 2,1 erythro regio-defects was quantified with respect to all propene:

[21e] mol.-%=100*($P_{21e}/P_{total}$)

Comonomer Determination by NMR Spectroscopy

Quantitative nuclear-magnetic resonance (NMR) spectroscopy was further used to quantify the comonomer content and comonomer sequence distribution of the polymers. Quantitative $^{13}C\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^{1}H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^{1}H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W.-J., Zhu, S., Macromolecules 33 (2000), 1157). Equations used for absolute propylene content were not modified.

The mole percent comonomer incorporation was calculated from the mole fraction:

$$E[\text{mol }\%]=100*fE$$

The weight percent comonomer incorporation was calculated from the mole fraction:

$$E[\text{wt }\%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Calculation of comonomer content of the second propylene copolymer fraction (R-PP2):

$$\frac{C(PP)-w(PP1)\times C(PP1)}{w(PP2)}=C(PP2) \qquad (I)$$

wherein
w(PP1) is the weight fraction [in wt.-%] of the first random propylene copolymer fraction (R-PP1),
w(PP2) is the weight fraction [in wt.-%] of second propylene copolymer fraction (R-PP2),
C(PP1) is the comonomer content [in wt.-%] of the first random propylene copolymer fraction (R-PP1),
C(PP) is the comonomer content [in wt.-%] of the random propylene copolymer (R-PP),
C(PP2) is the calculated comonomer content [in wt.-%] of the second random propylene copolymer fraction (R-PP2).

Calculation of the xylene cold soluble (XCS) content of the second propylene copolymer fraction (R-PP2):

$$\frac{XS(PP)-w(PP1)\times XS(PP1)}{w(PP2)}=XS(PP2) \qquad (II)$$

wherein
w(PP1) is the weight fraction [in wt.-%] of the first random propylene copolymer fraction (R-PP1),
w(PP2) is the weight fraction [in wt.-%] of second random propylene copolymer fraction (R-PP2),
XS(PP1) is the xylene cold soluble (XCS) content [in wt.-%] of the first random propylene copolymer fraction (R-PP1),
XS(PP) is the xylene cold soluble (XCS) content [in wt.-%] of the random propylene copolymer (R-PP),
XS(PP2) is the calculated xylene cold soluble (XCS) content [in wt.-%] of the second random propylene copolymer fraction (R-PP2).

Calculation of melt flow rate $MFR_2$ (230° C.) of the second propylene copolymer fraction (R-PP2):

$$MFR(PP2)=10^{\left[\frac{\log(MFR(PP))-w(PP1)\times\log(MFR(PP1))}{w(PP2)}\right]} \qquad (III)$$

wherein
w(PP1) is the weight fraction [in wt.-%] of the first random propylene copolymer fraction (R-PP1),
w(PP2) is the weight fraction [in wt.-%] of second random propylene copolymer fraction (R-PP2),
MFR(PP1) is the melt flow rate $MFR_2$ (230° C.) [in g/10 min] of the first random propylene copolymer fraction (R-PP1),
MFR(PP) is the melt flow rate $MFR_2$ (230° C.) [in g/10 min] of the random propylene copolymer (R-PP),
MFR(PP2) is the calculated melt flow rate $MFR_2$ (230° C.) [in g/10 min] of the second random propylene copolymer fraction (R-PP2).

Calculation of comonomer content of the elastomeric propylene copolymer (E), respectively:

$$\frac{C(RAHECO)-w(PP)\times C(PP)}{w(E)}=C(E) \qquad (IV)$$

wherein
w(PP) is the weight fraction [in wt.-%] of the random propylene copolymer (R-PP), i.e. polymer produced in the first and second reactor (R1+R2),
w(E) is the weight fraction [in wt.-%] of the elastomeric propylene copolymer (E), i.e. polymer produced in the third reactor (R3)
C(PP) is the comonomer content [in wt.-%] of the random propylene copolymer (R-PP), i.e. comonomer content [in wt.-%] of the polymer produced in the first and second reactor (R1+R2),
C(RAHECO) is the comonomer content [in wt.-%] of the propylene copolymer, i.e. is the comonomer content [in wt.-%] of the polymer obtained after polymerization in the third reactor (R4),
C(E) is the calculated comonomer content [in wt.-%] of elastomeric propylene copolymer (E), i.e. of the polymer produced in the third reactor (R3).

$MFR_2$ (230° C.) is measured according to ISO 1133 (230° C., 2.16 kg load).

Comonomer content, especially ethylene content is measured with Fourier transform infrared spectroscopy (FTIR) calibrated with $^{13}$C-NMR. When measuring the ethylene content in polypropylene, a thin film of the sample (thickness about 250 µm) was prepared by hot-pressing. The area of absorption peaks 720 and 733 cm$^{-1}$ for propylene-ethylene-copolymers was measured with Perkin Elmer FTIR 1600 spectrometer. Propylene-1-butene-copolymers were evaluated at 767 cm$^{-1}$. The method was calibrated by ethylene content data measured by $^{13}$C-NMR. See also "IR-Spektroskopie für Anwender"; WILEY-VCH, 1997 and "Validierung in der Analytik", WILEY-VCH, 1997

Intrinsic viscosity is measured according to DIN ISO 1628/1, October 1999 (in Decalin at 135° C.).

The xylene solubles (XCS, wt.-%): Content of xylene cold solubles (XCS) is determined at 25° C. according ISO 16152; first edition; 2005-07-01

Hexane soluble (C6-solubles, wt.-%): Content of hexane soluble is measured according to European Pharmacopoeia 6.0, EP316

10 g of a sample taken from 0.3 mm thick bottles was put into a 300 ml Erlenmeyer flask and 100 ml of n-hexane was added. The mixture was boiled under stirring in a reflux condenser for 4 h. The hot solution was cooled down under stirring for 45 min and filtered under vacuum (G4 glasfilter) and the filtrate is put into a round shenk (dried in a vacuum oven at 90° C. and weighted with 0.0001 g exactly). Then the hexane was evaporated under a nitrogen stream on a rotary evaporator. The round shenk was dried in a vacuum oven at 90° C. over night and was put into a desiccator for at least 2 hours to cool down. The shenk was weighted again and the hexane soluble was calculated therefrom.

Number Average Molecular Weight ($M_n$), Weight Average Molecular Weight ($M_w$) and Polydispersity (Mw/Mn)

are determined by Gel Permeation Chromatography (GPC) according to the following method:

The weight average molecular weight Mw and the polydispersity (Mw/Mn), wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methylphenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Melting temperature ($T_m$) and heat of fusion ($H_f$), crystallization temperature ($T_c$) and heat of crystallization ($H_c$): measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and heat of crystallization ($H_c$) are determined from the cooling step, while melting temperature and heat of fusion ($H_f$) are determined from the second heating step Flexural Modulus: The flexural modulus was determined in 3-point-bending at 23° C. according to ISO 178 on 80×10×4 mm$^3$ test bars injection moulded in line with EN ISO 1873-2

Description/Dimension of the Bottles 1 l bottles, having an outer diameter of 90 mm, wall thickness: 0.3 mm; overall-height of 204 mm, height of the cylindrical mantle of 185 mm Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature till processed further.

Transparency, Clarity, and Haze Measurement on Bottles

Instrument: Haze-gard plus from BYK-Gardner

Testing: according to ASTM D1003 (as for injection molded plates)

Method: The measurement is done on the outer wall of the bottles. The top and bottom of the bottles are cut off. The resulting round wall is then split in two, horizontally. Then from this wall six equal samples of app. 60×60 mm are cut from close to the middle. The specimens are placed into the instrument with their convex side facing the haze port. Then the transparency, haze and clarity are measured for each of the six samples and the haze value is reported as the average of these six parallels.

Gloss Measurement on Bottles

Instrument: Sceen TRI-MICROGLOSS 20-60-80 from BYK-Gardner 20

Testing: ASTM D 2457 (as for injection molded plates)

The bottles: It is measured on the wall of the bottles. The top and bottom of the bottles is cut off. This round wall is then split in two, horizontally. Then this wall is cut into six equal 25 samples of app. 90×90 mm, just to fit into a special light trap made for testing on injection molded parts. Then the gloss at 20° is measured on these six samples, and the average value is reported as gloss at 20°.

2. Examples

Catalyst for Inventive Examples

The catalyst used in the polymerization process for the heterophasic polypropylene copolymer (RAHECO) of the inventive examples (IE1) was prepared as follows:

Used chemicals:

20% solution in toluene of butyl ethyl magnesium (Mg(Bu)(Et), BEM), provided by Chemtura 2-ethylhexanol, provided by Amphochem 3-Butoxy-2-propanol—(DOWANOL™ PnB), provided by Dow bis(2-ethylhexyl)citraconate, provided by SynphaBase TiCl$_4$, provided by Millenium Chemicals Toluene, provided by Aspokem Viscoplex® 1-254, provided by Evonik Heptane, provided by Chevron Preparation of the Mg Alkoxy Compound:

Mg alkoxide solution was prepared by adding, with stirring (70 rpm), into 11 kg of a 20 wt % solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of TiCl$_4$ and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The thus obtained catalyst was used along with triethyl-aluminium (TEAL) as co-catalyst and di(cyclopentyl) dimethoxy silane (D-donor) as donor.

The molar ratio of co-catalyst (Co) to external donor (ED) [Co/ED] and the molar ratio of co-catalyst (Co) to titanium compound (TC) [Co/TC] are indicated in table 1.

Polymerization was performed in a Borstar pilot plant, comprising a prepolymerization reactor, a loop reactor and two or three gas phase reactors. The polymerization conditions are also indicated in table 1.

Catalyst for Comparative Examples

The catalyst used in the polymerization process for comparative examples CE1 has been produced as follows: First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. As co-catalyst triethyl-aluminium (TEAL) and as donor dicyclo pentyl dimethoxy silane (D-donor) was used. The aluminium to donor ratio is also indicated in table 1.

Production of Inventive and Comparative Examples

Polymerization was performed in a Borstar pilot plant, comprising a prepolymerization reactor, a loop reactor and two or three gas phase reactors. The polymerization conditions are indicated in Table 1. The properties of IE and CE are listed in Table 2 and Table 3.

Before the polymerization, the catalyst was prepolymerized with vinyl cyclohexane in an amount to achieve a concentration of 200 ppm poly(vinyl cyclohexane) (PVCH) in the final polymer. The respective process is described in EP 1 028 984 and EP 1 183 307. As additives 0.04 wt. % synthetic hydrotalcite (DHT-4A supplied by Kisuma Chemicals, Netherlands) and 0.15 wt % Irganox B 215 (1:2-blend of Irganox 1010 (Pentaerythrityl-tetrakis(3-(3',5'-di-tert.butyl-4-hydroxytoluyl)-propionate and tris (2,4-di-t-butylphenyl) t-butylphenyl) phosphate) phosphite) of BASF AG, Germany were added to the polymers in the same step. For the production of 1 liter round bottles like used for testing in the inventive work a "Fischer Müller" Blow Molding Machine was used. The main processing parameters for the production are as follows:

Temperature profile: 180 to 200° C. applied in extruder, adapter and head

Melt temperature measured: 190 to 200° C.

Speed of extruder (revolution per minute; rpm): 13 to 16 rpm

Die gap: the die gap was adjusted to get a bottle with a weight of 40 g with Borealis grade RB307MO (random propylene copolymer with a density of 902 $kg/m^3$ and a $MFR_2$ of 1.5 g/10 min)

Cycle time: 12 to 16 seconds

TABLE 1

Polymerization conditions

|  |  | IE1 | CE1 |
|---|---|---|---|
| TEAL/D | [mol/mol] | 7.7 | 15 |
| Loop |  |  |  |
| $MFR_2$ | [g/10 min] | 5.7 | 3.4 |
| C2 content | [wt.-%] | 2.1 | 2.0 |
| XCS | [wt.-%] | 4.8 | 3.8 |
| $H_2$/C3 ratio | [mol/kmol] | 1.13 | 2.99 |
| C2/C3 ratio | [mol/kmol] | 4.57 | 3.96 |
| 1 GPR |  |  |  |
| $MFR_2$ | [g/10 min] | 1.9 | 1.1 |
| C2 content | [wt.-%] | 5.6 | 5.1 |
| XCS | [wt.-%] | 15.6 | 15.8 |
| $H_2$/C3 ratio | [mol/kmol] | 2.8 | 5.2 |
| C2/C3 ratio | [mol/kmol] | 40.6 | 51.8 |
| 2 GPR |  |  |  |
| $MFR_2$ | [g/10 min] | 1.4 | 1.1 |
| C2 content | [wt.-%] | 8.1 | 9.0 |
| XCS | [wt.-%] | 31.2 | 32.8 |
| Tm | [° C.] | 147 | 150 |
| $H_2$/C3 ratio | [mol/kmol] | 103 | 369 |
| C2/C3 ratio | [mol/kmol] | 104 | 152 |
| Split |  |  |  |
| Loop | [wt.-%] | 40.0 | 34.3 |
| 1 GPR | [wt.-%] | 47.1 | 45.5 |
| 2 GPR | [wt.-%] | 12.9 | 20.2 |

TABLE 2

Properties

|  |  | IE1 | CE1 |
|---|---|---|---|
| $MFR_2$ | [g/10 min] | 1.7 | 1.1 |
| C2 | [wt.-%] | 8.1 | 9.0 |
| XCS | [wt.-%] | 31.2 | 32.8 |
| Tm | [° C.] | 147 | 150 |
| C2 of XCS | [wt.-%] | 17.6 | 18.4 |
| IV of XCS | [dl/g] | 2.6 | 2.5 |
| Mw/Mn of XCS | [—] | 6.5 | 6.4 |
| C2 of XCI | [wt.-%] | 3.7 | 4.4 |
| Mw/Mn of XCI | [—] | 5.6 | 5.2 |
| I(E) | [—] | 47 | 51 |
| Flex Modulus | [MPa] | 441 | 516 |
| C6-Solubles | [wt.-%] | 3.1 | 4.2 |

TABLE 3

Properties on EBM bottles

|  |  | IE1 | CE1 |
|---|---|---|---|
| Clarity b.s. | [%] | 79 | 67 |
| Clarity a.s | [%] | 79 | 66 |
| Haze b.s. | [%] | 34 | 25 |
| Haze a.s. | [%] | 36 | 26 |
| Gloss 20° b.s. | [%] | 9 | 7 |
| Gloss 20° a.s. | [%] | 7 | 8 |

What is claimed is:

1. A heterophasic propylene copolymer (RAHECO) having
   (a) a xylene cold soluble content (XCS) determined according ISO 16152 (25° C.) in the range of 25.0 to 35.0 wt.-%, and
   (b) a comonomer content in the range of more than 4.5 to 10.0 wt.-%,
   wherein further
   (c) the comonomer content of xylene cold soluble (XCS) fraction of the propylene copolymer is in the range of 12.0 to 22.0 wt.-%,
   (d) the intrinsic viscosity (IV) determined according to DIN ISO 1628/1 (in decalin at 135° C.) of the xylene cold soluble (XCS) fraction of the propylene copolymer is in the range of more than 1.5 to below 3.0 dl/g, and
   (e) the relative content of isolated to block ethylene sequences (I(E)) of the XCS fraction fulfilling the inequation (I)

$$I(E) < 78 - 1.97 \times C2 + 0.015 \times (C2)^2 \qquad (I)$$

wherein C2 is the comonomer content [wt %] of the XCS fraction and
   wherein the I(E) content is defined by equation (II)

$$I(E) = fPEP/((fEEE + fPEE + fPEP)) \times 100 \qquad (II)$$

wherein
   I(E) is the relative content of isolated to block ethylene sequences [in %];
   fPEP is the mol fraction of propylene/ethylene/propylene sequences (PEP) in the sample;
   fPEE is the mol fraction of propylene/ethylene/ethylene sequences (PEE) and of ethylene/ethylene/propylene sequences (EEP) in the sample;
   fEEE is the mol fraction of ethylene/ethylene/ethylene sequences (EEE) in the sample wherein all sequence concentrations are based on a statistical triad analysis of 13C-NMR data.

2. The heterophasic propylene copolymer (RAHECO) according to claim 1, wherein the xylene cold insoluble (XCI) fraction of the propylene copolymer has one or more of:
   (a) a polydispersity (Mw/Mn) of more than 4.9 to 10.0, or
   (b) a comonomer content in the range of 3.0 to 7.0.

3. The heterophasic propylene copolymer (RAHECO) according to claim 1, wherein the total melt flow rate $MFR_2$ (230° C.) of the heterophasic propylene copolymer (RAHECO) measured according to ISO 1133 is in the range of more than 0.8 to below 2.5 g/10 min.

4. The heterophasic propylene copolymer (RAHECO) according to claim 1, wherein the heterophasic propylene copolymer (RAHECO) comprises one or more of:
   (a) an α-nucleating agent, or
   (b) a hexane soluble content of below 5.5 wt.-%.

5. The heterophasic propylene copolymer (RAHECO) according to claim 1, wherein the heterophasic propylene copolymer (RAHECO) has a melting temperature Tm determined by differential scanning calorimetry (DSC) of not lower than 140° C.

6. The heterophasic propylene copolymer (RAHECO) according to claim 1, wherein the heterophasic propylene copolymer (RAHECO) comprises a matrix (M) and an elastomeric propylene copolymer (E) dispersed in said matrix (M), wherein
   (a) said matrix (M) is a random propylene copolymer (R-PP), and
   (b) the weight ratio between the matrix (M) and the elastomeric propylene copolymer (E) is 60/40 to 95/5.

7. The heterophasic propylene copolymer (RAHECO) according to claim 6, wherein the random propylene copolymer (R-PP) comprises one or more of:
   (a) a comonomer content in the range of 1.5 to 7.0 wt.-%, or
   (b) fulfills inequation (III)

$$Co(total)/Co(RPP) \geq 1.3 \qquad (III)$$

wherein
   Co (total) is the comonomer content [wt.-%] of the heterophasic propylene copolymer (RAHECO),
   Co (RPP) is the comonomer content [wt.-%] of the random propylene copolymer (R-PP),
   or
   (c) has a xylene cold soluble (XCS) fraction in the range of 8.0 to below 20.0 wt.-%.

8. The heterophasic propylene copolymer (RAHECO) according to claim 6, wherein the elastomeric propylene copolymer (E) has a comonomer content of not higher than 30.0 wt.-%.

9. The heterophasic propylene copolymer (RAHECO) according to claim 1, wherein an extrusion blow molded bottle with wall thickness of 0.3 mm comprising the said heterophasic propylene copolymer (RAHECO) has a clarity determined according to ASTM D1003 of higher than 70.0%.

10. A polymerization process for producing a heterophasic propylene copolymer (RAHECO), comprising the steps of
    (a) polymerizing in a first reactor (R1) propylene and one or more of ethylene or a C4 to C12 α-olefin,
       obtaining a first random propylene copolymer fraction (R-PP1),
    (b) transferring the first random propylene copolymer fraction (R-PP1), into a second reactor (R2),
    (c) polymerizing in said second reactor (R2) in the presence of the first random propylene copolymer fraction (R-PP1),
       propylene and one or more of ethylene or a C4 to C12 α-olefin,
       obtaining a second random propylene copolymer fraction (R-PP2), the first and second polymer fraction form the random propylene copolymer (R-PP),
    (d) transferring said random propylene copolymer (R-PP), into a third reactor (R3),
    (e) polymerizing in said third reactor (R3) in the presence of the random propylene copolymer (R-PP),
       propylene and one or more of ethylene or a C4 to C12 α-olefin,
       obtaining a third polymer fraction, said third polymer fraction is the elastomeric propylene copolymer (E); the third polymer fraction and the random propylene copolymer (R-PP) form the heterophasic propylene copolymer (RAHECO), and
    (f) removing the propylene copolymer from the third reactor (R3),
    wherein the heterophasic propylene copolymer (RAHECO) comprises:
    (a) a xylene cold soluble content (XCS) determined according ISO 16152 (25° C.) in the range of 25.0 to 35.0 wt.-%, and
    (b) a comonomer content in the range of more than 4.5 to 10.0 wt.-%, wherein further
(c) the comonomer content of xylene cold soluble (XCS) fraction of the propylene copolymer is in the range of 12.0 to 22.0 wt.-%,
(d) the intrinsic viscosity (IV) determined according to DIN ISO 1628/1 (in decalin at 135° C.) of the xylene cold soluble (XCS) fraction of the propylene copolymer is in the range of more than 1.5 to below 3.0 dl/g, and
(e) the relative content of isolated to block ethylene sequences (I(E)) of the XCS fraction fulfilling the inequation (I)

$$I(E) < 78 - 1.97 \times C2 + 0.015 \times (C2)^2 \qquad (I)$$

wherein C2 is the comonomer content [wt %] of the XCS fraction and
wherein the I(E) content is defined by equation (II)

$$I(E) = fPEP/((fEEE + fPEE + fPEP)) \times 100 \qquad (II)$$

wherein
I(E) is the relative content of isolated to block ethylene sequences [in %];
fPEP is the mol fraction of propylene/ethylene/propylene sequences (PEP) in the sample;
fPEE is the mol fraction of propylene/ethylene/ethylene sequences (PEE) and of ethylene/ethylene/propylene sequences (EEP) in the sample;
fEEE is the mol fraction of ethylene/ethylene/ethylene sequences (EEE) in the sample wherein all sequence concentrations are based on a statistical triad analysis of 13C-NMR data.

11. The polymerization process according to claim 10, wherein steps a), c), and e) of claim 10 are carried out in the presence of
a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound,
b) a co-catalyst (Co), and
c) optionally an external donor (ED).

12. The polymerization process according to claim 11, wherein the internal donor (ID) is selected from the group consisting of malonates, maleates, succinates, glutarates, cyclohexene-1,2-dicarboxylates, benzoates, derivatives and mixtures thereof.

13. A molded article comprising a heterophasic propylene copolymer (RAHECO), wherein the heterophasic propylene copolymer (RAHECO) comprises:
(a) a xylene cold soluble content (XCS) determined according ISO 16152 (25° C.) in the range of 25.0 to 35.0 wt.-%, and
(b) a comonomer content in the range of more than 4.5 to 10.0 wt.-%,
wherein further
(c) the comonomer content of xylene cold soluble (XCS) fraction of the propylene copolymer is in the range of 12.0 to 22.0 wt.-%,
(d) the intrinsic viscosity (IV) determined according to DIN ISO 1628/1 (in decalin at 135° C.) of the xylene cold soluble (XCS) fraction of the propylene copolymer is in the range of more than 1.5 to below 3.0 dl/g, and
(e) the relative content of isolated to block ethylene sequences (I(E)) of the XCS fraction fulfilling the inequation (I)

$$I(E) < 78 - 1.97 \times C2 + 0.015 \times (C2)^2 \qquad (I)$$

wherein C2 is the comonomer content [wt %] of the XCS fraction and
wherein the I(E) content is defined by equation (II)

$$I(E) = fPEP/((fEEE + fPEE + fPEP)) \times 100 \qquad (II)$$

wherein
I(E) is the relative content of isolated to block ethylene sequences [in %];
fPEP is the mol fraction of propylene/ethylene/propylene sequences (PEP) in the sample;
fPEE is the mol fraction of propylene/ethylene/ethylene sequences (PEE) and of ethylene/ethylene/propylene sequences (EEP) in the sample;
fEEE is the mol fraction of ethylene/ethylene/ethylene sequences (EEE) in the sample wherein all sequence concentrations are based on a statistical triad analysis of 13C-NMR data.

14. The molded article according to claim 13, wherein the article is a bottle.

15. The polymerization process according to claim 11, wherein the non-phthalic compound comprises a non-phthalic acid ester.

16. The polymerization process according to claim 12, wherein the internal donor (ID) is a citraconate.

17. The molded article according to claim 13, wherein the molded article is an extrusion blow molded article.

18. The molded article according to claim 14, wherein the molded article is an extrusion blow molded article.

19. The polymerization process according to claim 15, wherein the internal donor (ID) is selected from the group consisting of malonates, maleates, succinates, glutarates, cyclohexene-1,2-dicarboxylates, benzoates, derivatives and mixtures thereof.

20. The polymerization process according to claim 19, wherein the internal donor (ID) is a citraconate.

* * * * *